US012624824B1

(12) United States Patent
Cai

(10) Patent No.: US 12,624,824 B1
(45) Date of Patent: May 12, 2026

(54) LAMP AND ASSEMBLY METHOD THEREFOR

(71) Applicant: Guangdong Chuangpu Technology Co., Ltd., Dongguan City (CN)

(72) Inventor: Chengxun Cai, Guangdong Province (CN)

(73) Assignee: Guangdong Chuangpu Technology Co., Ltd., Dongguan City (CN)

(*) Notice: Subject to any disclaimer, the term of this patent is extended or adjusted under 35 U.S.C. 154(b) by 0 days.

(21) Appl. No.: 19/343,116

(22) Filed: Sep. 29, 2025

(51) Int. Cl.
*F21V 23/00* (2015.01)
*F21S 8/00* (2006.01)
*F21V 23/06* (2006.01)
*F21Y 115/10* (2016.01)

(52) U.S. Cl.
CPC .............. *F21V 23/06* (2013.01); *F21S 8/036* (2013.01); *F21V 23/002* (2013.01); *F21Y 2115/10* (2016.08)

(58) Field of Classification Search
CPC ......... F21V 23/06; F21V 23/002; F21S 8/036
See application file for complete search history.

(56) References Cited

U.S. PATENT DOCUMENTS

| | | | | |
|---|---|---|---|---|
| 6,607,284 | B1 * | 8/2003 | Tsai | F21S 4/20 362/121 |
| 11,402,083 | B1 | 8/2022 | Lu et al. | |
| 11,408,601 | B1 | 8/2022 | Lu et al. | |
| 12,215,847 | B1 * | 2/2025 | Yang | F21V 31/005 |
| 2005/0248156 | A1 | 11/2005 | Hsieh | |
| 2008/0212324 | A1 * | 9/2008 | Lin | F21S 6/003 362/287 |
| 2022/0357026 | A1 | 11/2022 | Zhang | |
| 2023/0101336 | A1 * | 3/2023 | Jiang | F21V 21/26 362/418 |
| 2024/0341443 | A1 * | 10/2024 | Qi | A45D 29/00 |
| 2025/0198609 | A1 * | 6/2025 | Zhang | F21V 5/008 |

* cited by examiner

*Primary Examiner* — Gerald J Sufleta, II

(57) ABSTRACT

Provided is a lamp, including a base, a connection structure, and a light-emitting assembly. The connection structure includes a pivot connecting member, a bending component, and an axial limiting structure, so that the light-emitting assembly rotates relative to the base by using the axial limiting structure, the lighting direction and angle are greatly expanded, and the defect of single direction of the conventional lamp is overcome. Meanwhile, the light-emitting assembly and the connection structure are connected by the plugging between the male connector and the female connector, and modularization is achieved. The lamp is simple and convenient in installation, but also greatly facilitates the subsequent separate replacement or repair of the light-emitting assembly, thereby reducing maintenance costs.

19 Claims, 5 Drawing Sheets

LAMP AND ASSEMBLY METHOD THEREFOR

TECHNICAL FIELD

The present invention relates to the technical field of lamps, and in particular, to a lamp and an assembly method therefor.

BACKGROUND

A wall lamp, as a wall-fixed lighting device, has both lighting and decorative functions and thus is widely used in bedrooms, corridors, guest rooms, and other areas. The existing lamps generally have the defects of fixed lighting direction and inconvenient adjustment. The wall lamp mainly adopts a structure in which a lamp arm is rigidly connected to a base, resulting in a single lighting angle after installation and failing to meet the requirements of multi-directional lighting.

SUMMARY

A primary objective of the present invention is to provide a lamp, which aims to overcome the defect of fixed lighting angles in conventional lamps.

To achieve the foregoing objective, the lamp provided by the present invention includes:

- a base, including an accommodating cavity, wherein a control assembly is provided in the accommodating cavity;
- a connection structure, including a pivot connecting member, a bending component and an axial limiting structure, wherein the pivot connecting member is provided with a second through hole penetrating therethrough, one end of the pivot connecting member extends into the accommodating cavity and is fixedly connected to the base, and the pivot connecting member is provided with the axial limiting structure;
- the bending component includes a vertical tube and a transverse tube provided with first through holes penetrating therethrough, wherein the vertical tube abuts against an upper surface of the base, the pivot connecting member is sleeved in the vertical tube, and the axial limiting structure is configured to limit relative movement of the vertical tube and the pivot connecting member along a vertical direction and allow relative rotational movement of the vertical tube and the pivot connecting member;
- a male connector is provided at a free end of the transverse tube, and an electric wire sequentially passes through the first through hole and the second through hole and then is electrically connected to the control assembly; and
- a light-emitting assembly provided with a female connector cooperating with the male connector, wherein the light-emitting assembly is detachably connected to the connection structure through cooperation between the male connector and the female connector, and is thereby electrically connected to the control assembly.

The present invention also provides an assembly method for the lamp, which includes:

- S1. assembly of the connection structure: screwing and fixing a first member and the vertical tube through threads, inserting the male connector into the transverse tube and fixing the male connector through riveting, and connecting an electric wire to the control assembly after sequentially passing through the male connector, the transverse tube, the first through hole, the first member and a second member;
- S2. fixation of the connection structure: passing a lower end of the second member through the base and fastening and fixing the lower end of the second member in the accommodating cavity with a hollow nut, thereby completing the assembly and electrical connection between the connection structure and the base;
- S3. assembly of the light-emitting assembly: sleeving a silicone ring in a placement groove of a connector, fixing the female connector on the connector, connecting the connector to one end of a lamp tube body, and mounting a plug at the other end of the lamp tube body; and
- S4. final assembly: aligning and inserting the female connector on the light-emitting assembly to the male connector on the connection structure to complete the assembly of the lamp.

According to the present invention, the lamp is provided with the connection structure configured to connect the base and the light-emitting assembly, and the connection structure includes the pivot connecting member, the bending component and the axial limiting structure, so that the light-emitting assembly rotates relative to the base by using the axial limiting structure, the lighting direction and angle are greatly expanded, and the defect of single direction of the conventional lamp is overcome. Meanwhile, the light-emitting assembly and the connection structure are connected by the plugging between the male connector and the female connector, and modularization is achieved. The lamp is simple and convenient in installation, but also greatly facilitates the subsequent separate replacement or repair of the light-emitting assembly, thereby reducing maintenance costs.

BRIEF DESCRIPTION OF THE DRAWINGS

To more clearly illustrate the technical solutions in the embodiments of the present invention or in the prior art, the drawings required to be used in the description of the embodiments or the prior art are briefly introduced below. It is clear that the drawings in the description below are some embodiments of the present invention, and those of ordinary skill in the art can obtain other drawings according to the structures illustrated in these drawings without creative efforts.

DESCRIPTIONS OF REFERENCE NUMERALS

Figure 1:
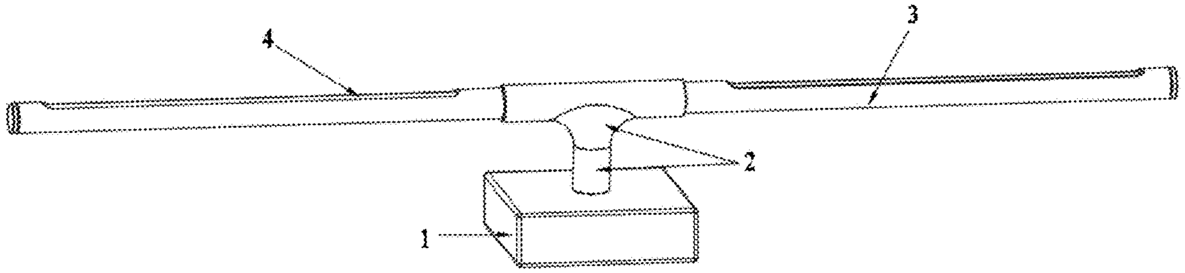
FIG. 1 is a schematic diagram of a structure of a wall lamp according to the present invention.

1. base; 11. mounting hole; 12. accommodating cavity;
2. connection structure; 21. pivot connecting member; 211. second through hole; 212. first member; 2121. hook; 2122. annular groove; 2123. first external thread; 213. second member; 2131. annular clamping groove; 2132. annular protrusion; 2133. second external thread; 22. bending component; 221. vertical tube; 2211. first step; 2212. first internal thread; 222. transverse tube; 2221. second step; 2222. third step; 23. DC plug; 231. electric wire; 24. first through hole; 25. axial limiting structure;
3. light-emitting assembly; 31. DC socket; 32. connector; 321. placement groove; 322. third external thread; 33. silicone ring; 34. lamp tube body; 341. third internal thread; 35. lamp panel assembly; 36. opening; 37. light-transmitting cover; 38. plug; and
4. light-transmitting area.

The realization of the objectives, the functional features, and the advantages of the present invention will be further explained in conjunction with the embodiments and with reference to the drawings.

DETAILED DESCRIPTION OF THE EMBODIMENTS

The following clearly and completely describes the technical solutions in the embodiments of the present invention with reference to the drawings in the embodiments of the present invention. It is clear that the described embodiments are merely a part rather than all of the embodiments of the present invention. All other embodiments obtained by those of ordinary skill in the art based on embodiments of the present invention without creative efforts shall fall within the protection scope of the present invention.

It should be noted that, if directional indications (such as upper, lower, left, right, front and rear) are involved in the embodiments of the present invention, the directional indications are only used to explain the relative positional relationships, the motion situations and the like between individual components under a certain pose (as shown in the drawings), and if the certain pose is changed, the directional indications are changed accordingly.

In addition, if there are descriptions relating to “first”, “second” and the like in the embodiments of the present invention, the descriptions of “first”, “second” and the like are for descriptive purposes only and are not to be construed as indicating or implying relative importance thereof or implicitly indicating the quantities of the indicated technical features. Thus, a feature defined by “first” or “second” may explicitly or implicitly include at least one such feature. In addition, “and/or” appearing herein is meant to include three parallel solutions, and taking “A and/or B” as an example, it includes solution A, or solution B, or both solution A and solution B. In addition, the technical solutions among various embodiments may be combined with each other; however, this combination must be based on that it can be implemented by those of ordinary skill in the art. When the combination of the technical solutions is contradictory or cannot be implemented, such a combination of the technical solutions should not be considered to exist, and is not within the protection scope of the present invention.

Figure 2:
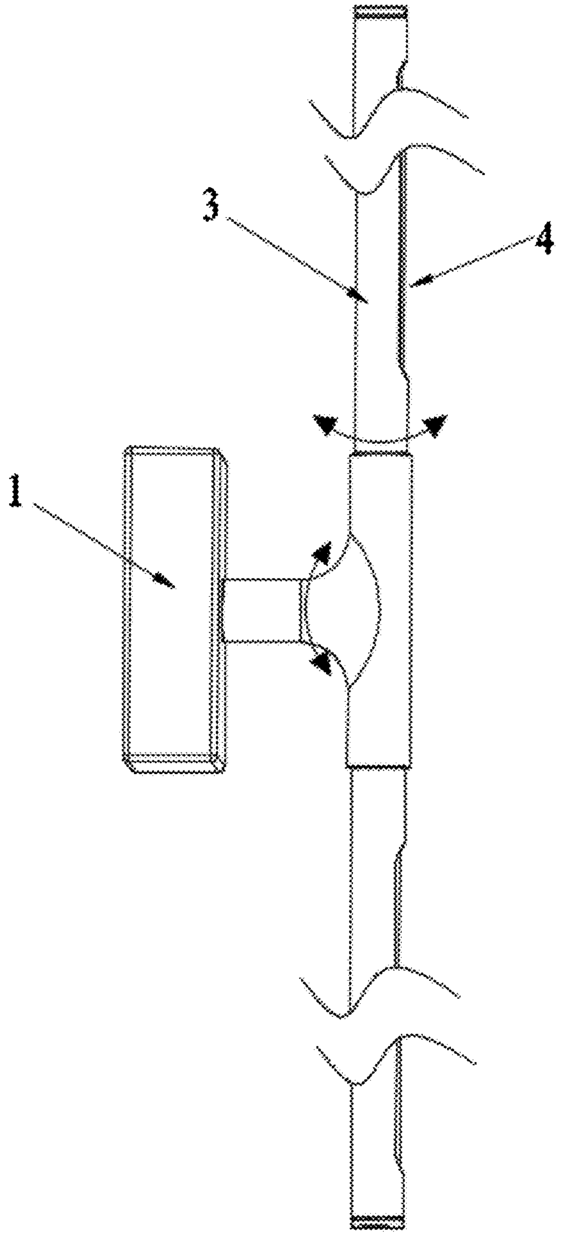
FIG. 2 is a schematic diagram of a wall lamp according to the present invention in use.
Figure 3:
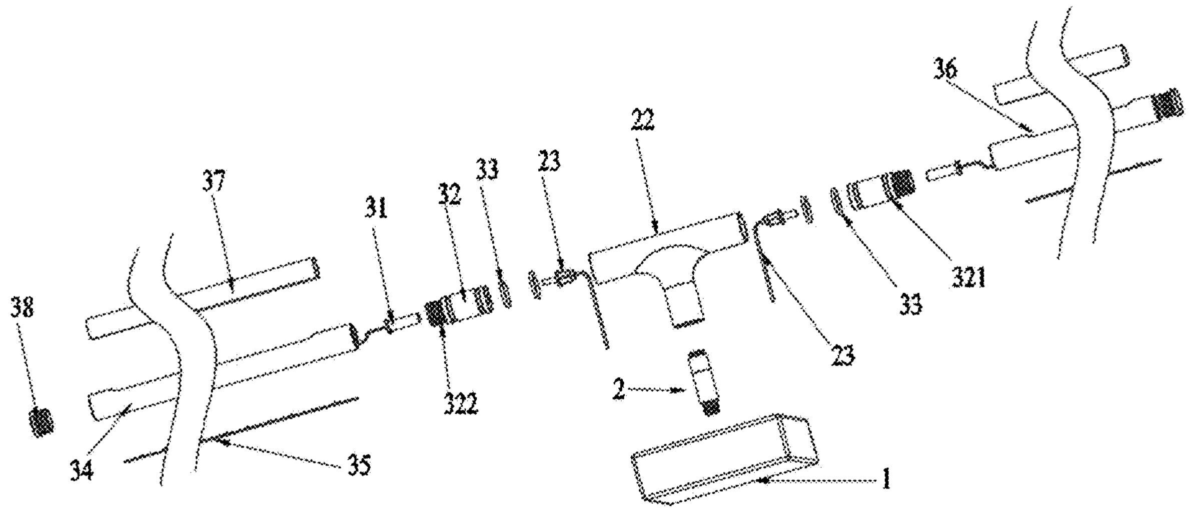
FIG. 3 is a schematic diagram of a structure of a wall lamp according to the present invention.

Referring to FIGS. 1 to 10, this embodiment provides a lamp, which mainly includes a base 1, a connection structure 2, and a light-emitting assembly 3. The lamp in the present invention may be a wall lamp, a table lamp, and the like. An embodiment of the present invention is described by taking the lamp in the present invention as a wall lamp as a specific implementation. FIG. 2 shows the placement of the lamp in the present invention when used as a wall lamp, in which the lamp is placed vertically and fixed on the wall. The other figures all show the lamp in a transverse placement state. The arrow directions in FIG. 2 indicate the corresponding rotatable directions of the lamp.

The base 1 may include a housing of any shape, such as a cuboid or cylinder, with an accommodating cavity 12 formed inside. A control assembly (not shown in the figure) is provided in the cavity. The corresponding control assembly is configured to control the on/off state, the brightness level, and the like, of the wall lamp. A battery component may also be provided in the accommodating cavity 12. The control assembly may also be provided with an interface or a power cord to connect to an external power source. A switch connected to the control assembly may be provided on the housing of the base 1.

The connection structure 2 is a core for implementing the rotation of the light-emitting assembly 3 relative to the base 1. The connection structure 2 includes a pivot connecting member 21, a bending component 22, and an axial limiting structure.

Referring to FIGS. 3 to 6, the pivot connecting member 21 is configured to connect the bending component 22 and the base 1, a center of the pivot connecting member 21 is provided with a second through hole 211 along an axial direction of the pivot connecting member 21, and a lower end of the pivot connecting member 21 extends into the accommodating cavity 12 of the base 1 and is fixedly connected to the base 1. The bending component 22 at least includes a vertical tube 221 and a transverse tube 222 arranged by bending, a first through hole 24 penetrating through the two tubes is formed in the two tubes, and the first through hole 24 penetrates through the second through hole 211. A lower end of the vertical tube 221 is sleeved outside the pivot connecting member 21, and a tail end of the vertical tube 221 abuts against an upper surface of the base 1. To achieve the relative rotation between the pivot connecting member 21 and the bending component 22, the connection structure 2 further includes an axial limiting structure, wherein the axial limiting structure is configured to limit relative movement of the vertical tube 221 and the pivot connecting member 21 along a vertical direction and allow relative rotational movement of the vertical tube 221 and the pivot connecting member 21.

A male connector is secured at an opening of the transverse tube 222. An electric wire 231 of the male connector is led out from an inner welding point of the male connector, passes through the transverse tube 222, the vertical tube and the second through hole 211 in sequence, and finally enters the accommodating cavity 12 and is welded to the corresponding interface of the control assembly for conduction.

The light-emitting assembly 3 is an element configured to provide illumination, and is provided with a female connector cooperating with the male connector. The light-emitting assembly 3 is detachably connected to the connection structure 2 through cooperation between the male connector and the female connector, and is thereby electrically connected to the control assembly.

The wall lamp with the foregoing structure has the advantages of flexible adjustment, convenient installation, beautiful appearance, safety and easy maintenance, and features both significant practicality and high economy. Through the rotatable design of the pivot connecting member 21 and the bending component 22, the light-emitting assembly 3 can rotate freely and has the characteristic of flexible and adjustable illumination angle, so that the single lighting direction of the conventional lamp is overcome. Meanwhile, since the lamp body has a large range of adjustment capabilities, the lamp can achieve the function without relying on a predetermined installation position, and the installation position is not limited, which greatly expands the application scenarios of the lamp.

The electric wire 231 is arranged in the through holes of the bending component 22 and the pivot connecting member 21, and is finally connected into the accommodating cavity 12 of the base 1, so that a complete hidden wiring path is formed, the disorder and potential risk of exposed cables are avoided, the appearance of a product is cleaner, the wiring is more attractive, and the safety and reliability are achieved. Meanwhile, the light-emitting assembly 3 and the connection structure 2 are connected by the plugging between the male connector and the female connector, and modularization is achieved. The installation is simple and convenient, the volume during transportation is reduced, the subsequent separate replacement or repair of the light-emitting assembly 3 is greatly facilitated, and the maintenance cost is reduced.

In the present invention, the connection structure 2 and the base 1 of the wall lamp are made of metal. The wall lamp is made of metal and is arranged with the internal wire 231, which makes it unsuitable for welding; therefore, the foregoing structure facilitates assembly and disassembly of the wall lamp. In other embodiments, the corresponding connection structure 2 may also be made of plastic or the like. This should not be construed as a limitation to the present invention. The corresponding base 1 may be provided with structures such as a buckle, may be hung on a wall surface by a hook, or may be fixed on the wall surface by a screw.

Figure 5:
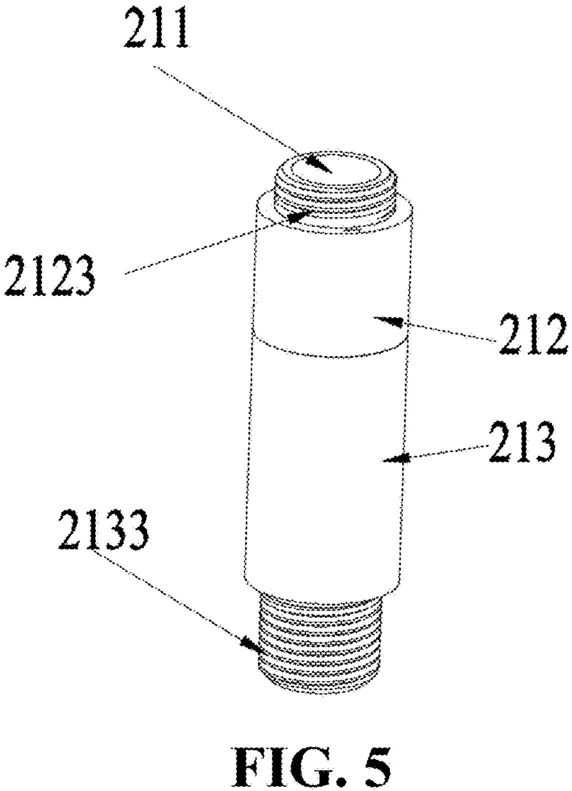
FIG. 5 is a schematic diagram of a structure of a pivot connecting member according to the present invention.
Figure 6:
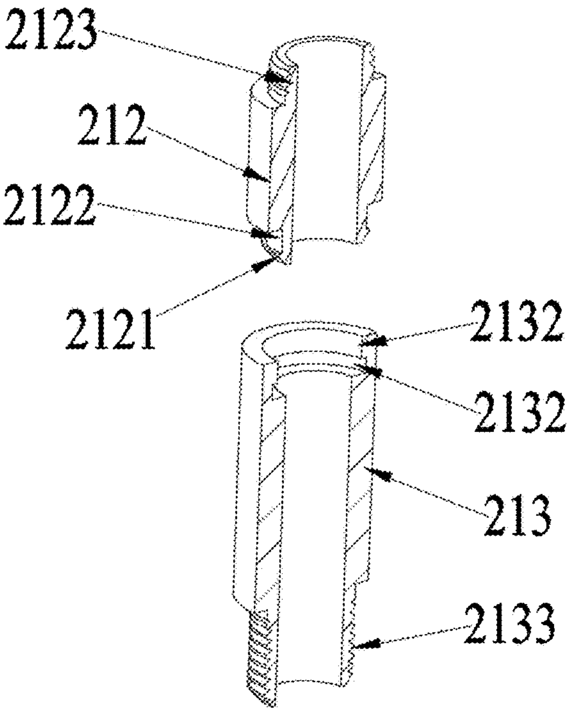
FIG. 6 is a schematic diagram of a cross-sectional exploded structure of a pivot connecting member according to the present invention.

Specifically, referring to FIG. 5 and FIG. 6, in an embodiment, the pivot connecting member 21 includes a first member 212 and a second member 213 that are coaxially arranged and may rotate relative to each other, a lower end of the second member 213 extends into the accommodating cavity 12 and is fixedly connected to the base 1, an upper end of the first member 212 is connected to the vertical tube 221, a lower end of the first member 212 is provided with a first engagement portion, an upper end of the second member 213 is provided with a second engagement portion adapted to the first engagement portion, and the first engagement portion and the second engagement portion may be assembled and clamped to form the axial limiting structure.

The pivot connecting member 21 adopts a split structure and is formed by the first member 212 and the second member 213 that are coaxially arranged and may rotate relative to each other. The second member 213 extends into and is fixed in the accommodating cavity 12 of the base 1, so as to form an axial limit for the pivot connecting member 21 and prevent the pivot connecting member 21 from moving upward. The first member 212 is used as a movable carrier, the upper end of the first member 212 is fixedly connected to the vertical tube 221 of the bending component 22 through threads, and the first engagement portion is processed and formed at the lower end of the first member 212. In this embodiment, the first engagement portion is a hook 2121, and correspondingly, a second engagement portion adapted to the first engagement portion is provided at the upper end of the second member 213 and is a recessed annular clamping groove 2131, and the first member 212 and the second member 213 are sleeved together by clamping, so as to form the axial limiting structure. This structure can effectively prevent the vertical tube 221 and the light-emitting assembly 3 connected thereto from shifting or disengaging in the axial direction, and ensure that the first member 212 may drive the bending component 22 to rotate horizontally relative to the fixed second member 213.

Specifically, to enable the pivot connecting member 21 to be better assembled inside the vertical tube 221, an outer diameter of the first member 212 is configured as the same as that of the second member 213, a lower part of the first member 212 is provided with an annular groove 2122, the hook 2121 is arranged at a lower end of the annular groove 2122, an upper end of the annular clamping groove 2131 is provided with an annular protrusion 2132 matching the annular clamping groove 2131, and the corresponding annular protrusion 2132 abuts against a side wall of the annular groove 2122 after the first member 212 and the second member 213 are assembled, so that the outer surfaces of the first member 212 and the second member 213 are aligned.

In other embodiments, the corresponding axial limiting structure may be arranged between the vertical tube 221 and the pivot connecting member 21, and the axial limiting structure may be implemented between the vertical tube 221 and the pivot connecting member 21 using a bearing-like structure, or a sleeve or bushing-like structure. Similarly, the corresponding limiting manner may also be arranged between the first member 212 and the second member 213.

Figure 10:
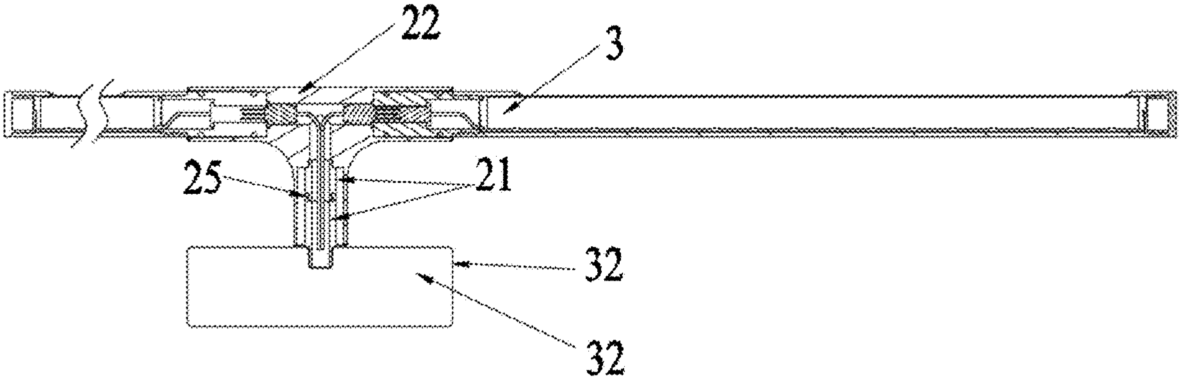
FIG. 10 is a cross-sectional view of a wall lamp according to the present invention.

Further, referring to FIG. 10, to facilitate the connection between the pivot connecting member 21 and the bending component 22 and limit the rotation angle of the bending component 22, a first step 2211 is provided inside the vertical tube 221, a first internal thread 2212 is provided on an end surface of the first step 2211, a first external thread 2123 matching the first internal thread 2212 is provided on the upper end of the first member 212, the first member 212 is screwed into the vertical tube 221 by the cooperation between the first external thread 2123 and the first internal thread 2212, and an upper end part of the first member 212 abuts against the end surface of the first step 2211. The combined action of the threaded connection between the bending component 22 and the pivot connecting member 21 as well as the axial limiting structure of the pivot connecting member 21 ensures the stability of the bending component 22 and the pivot connecting member 21, and achieves the limitation of the rotation angle. The thread arrangement specifications of the first internal thread 2212 and the first external thread 2123 preferably meet the requirement that the bending component 22 can rotate by 360°. During assembly, the first external thread 2123 of the first member 212 is aligned with an opening of the vertical tube 221, and is screwed into the first internal thread 2212 and continuously tightened until an upper end surface of the first member 212 abuts and fits tightly against the end surface of the first step 2211. In this case, a pre-tightening force generated by the thread pair and a huge friction force between the end surfaces work together to achieve absolute fixation between the first member and the vertical tube, which eliminates any loosening or shaking that may occur during use, and ensures the rigidity and stability of the connection structure 2.

Further, to facilitate the connection between the second member 213 and the base 1, a second external thread 2133 is provided at the lower end of the second member 213, a hollow nut (not shown in the figure) is provided in the accommodating cavity 12, and the second member 213 is locked in the accommodating cavity 12 of the base 1 by the thread fit between the hollow nut and the second external thread 2133. The second member 213 is locked by the hollow nut, so that the second member 213 is connected to the base 1, and the second member 213 may also drive the hollow nut to perform fine position adjustment under the action of the relative force when the pivot connecting member 21 rotates relatively. In other embodiments, the second member 213 and the base 1 may be fixed in a buckling manner or the like. During assembly, the second member 213 is inserted from above the base 1, so that the lower end of the second member passes through a mounting hole 11 on a top wall of the base 1 and extends into the accommodating cavity 12. Subsequently, a hollow nut is screwed into the second external thread 2133 at the lower end of the second member 213 inside the accommodating cavity 12, and then the hollow nut is tightened, so that all the fastening structures are hidden inside the base 1, and the overall appearance is simple and attractive viewed from the outside.

Figure 4:
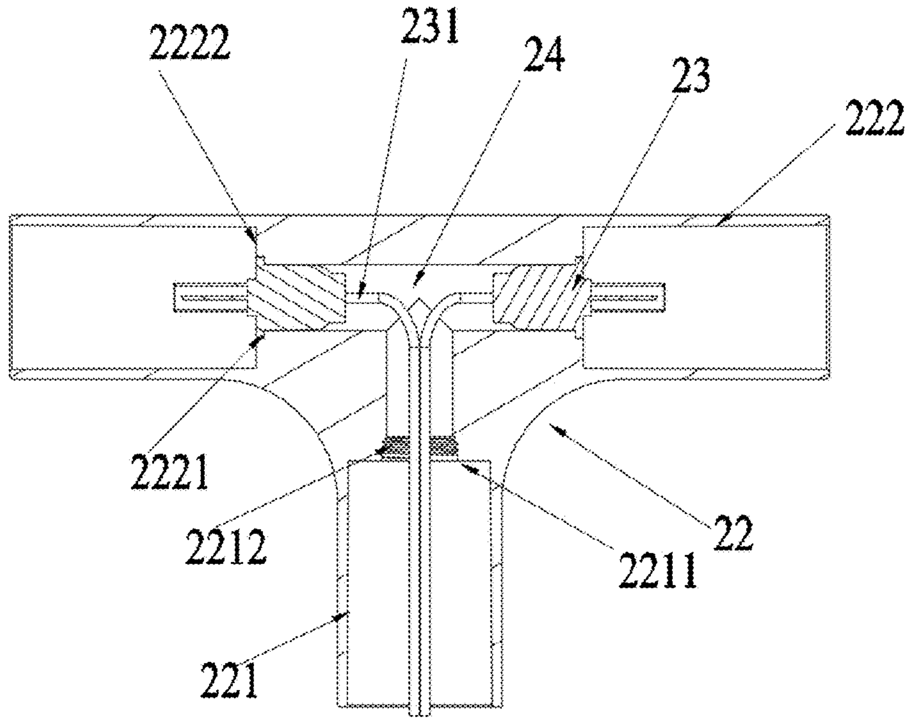
FIG. 4 is a schematic diagram of a structure of a bending component according to the present invention.

In the present invention, as shown in FIG. 4, to achieve a wider range of lighting effects and enhance decorativeness, the wall lamp adopts a T-shaped bending component 22. This component is formed by integrally bending the vertical tube 221 and two transverse tubes 222 extending in opposite directions with an axis of the vertical tube 221 as a symmetry axis, and the internal channels of the three tubes are completely communicated at connections to form a continuous T-shaped cavity. The two light-emitting assemblies 3 are respectively plugged in the male connectors at the ends of the two transverse tubes 222 through the female connectors thereon, thereby forming a dual-light lamp, which is more attractive. In other embodiments, the bending component 22 may be cross-shaped or in other shapes. This is not specifically limited herein.

In the present invention, the connection structure 2 is provided with the male connector, and the light-emitting assembly 3 is provided with the female connector, so that the detachable connection between the light-emitting assembly 3 and the connection structure 2 is achieved. When the light-emitting assembly 3 is inserted into the connection structure 2, the electric connection may be achieved; and when the light-emitting assembly is removed, the electrical connection is cut off, which reduces the volume and facilitates storage and transportation.

Further, referring to FIG. 4, the male connector is fixed using a combination of built-in stops and port sealing. A circle of second steps 2221 protruding radially inward is formed inside each of the transverse tubes 222. An annular abutting part extending radially outward is provided at one end of the male connector facing the interior of the transverse tube 222, and an outer diameter of the annular abutting part is larger than an inner diameter of the second step 2221. During assembly, the male connector connected to the electric wire 231 is inserted inwards from the opening of the transverse tube 222 until an abutting part of the male connector is in close contact with an end surface of a second step 2221, and the male connector may be secured onto the second step by adopting a pressing process, a clamping groove, or the like. The second step 2221 is arranged at a position of the transverse tube 222 close to the vertical tube, so that the electric wire 231 passes through the vertical tube from the transverse tube 222 and is electrically connected to the control assembly through the second through hole 211 of the pivot connecting member 21.

In an embodiment of the present invention, the corresponding male connector is a DC (direct current) plug 23, and the female connector is a DC socket 31 matching the DC plug 23. The connectors are standardized, low-voltage, large-current, and common connectors, and are very suitable for LED lighting products. The DC connector has the advantages of reverse plugging prevention, small contact resistance, strong current carrying capacity and the like, and the rated voltage of the DC connector matches the low-voltage direct current output by the control assembly, so that the safety and the universality of products are greatly improved. The low-voltage characteristic of the DC plug 23 also significantly reduces the risk of electric shock if the DC plug is accidentally charged. In other embodiments, the corresponding male connector and female connector may be Pogopins or the like.

In this embodiment, the DC socket 31 is fixed on a dedicated connector 32, and the connector 32 serves as a mechanical and electrical interface between the light-emitting assembly 3 and the connection structure 2. Specifically, an independent connector 32 is provided at an end part of the light-emitting assembly 3, and the connector is provided with a mounting position inside. The DC socket 31 is fixedly mounted on the connector 32 by a buckle, a pressure plate or a screw, and is electrically connected to the light-emitting assembly 3. When the light-emitting assembly 3 is connected to the connection structure 2, the user actually holds the light-emitting assembly 3 in hand, and aligns and inserts the connector 32 into the opening of the transverse tube 222. This insertion action allows a precise plugging fit between the DC socket 31 fixed inside the connector 32 and the DC plug 23 secured in the transverse tube 222, thereby simultaneously completing the mechanical connection and electrical conduction.

Figure 7:
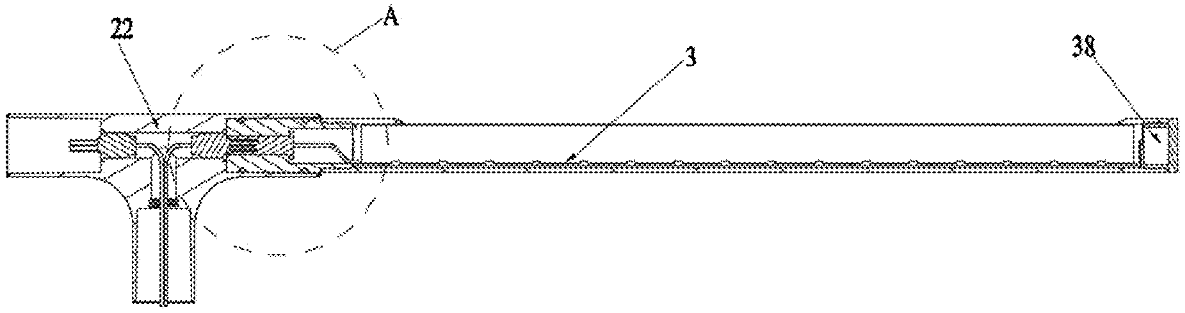
FIG. 7 is a cross-sectional view of a connection portion between a connection structure and a light-emitting assembly according to the present invention.
Figure 8:
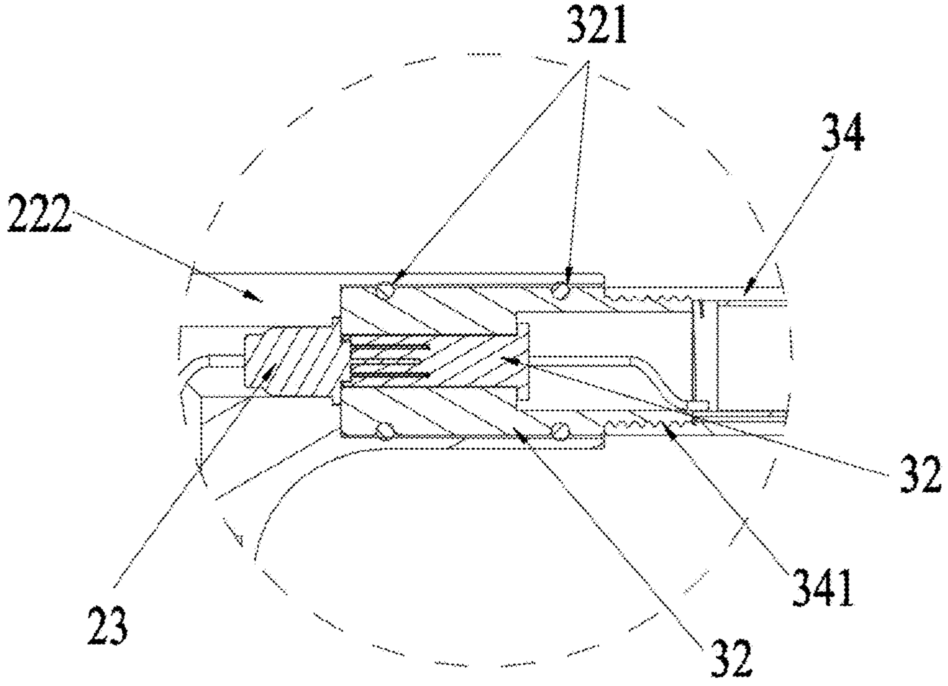
FIG. 8 is an enlarged view of FIG. 7.
Figure 9:
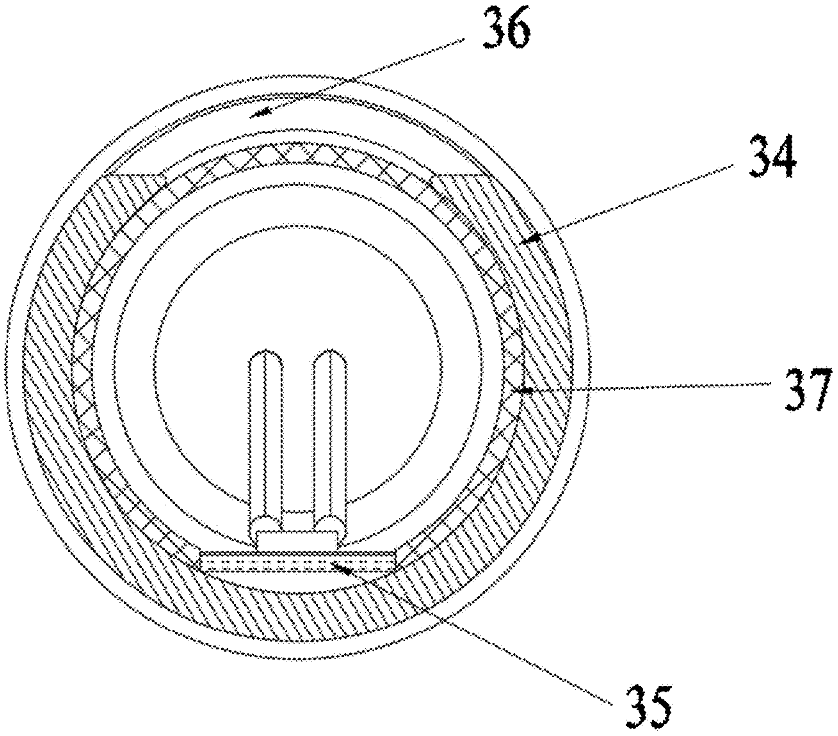
FIG. 9 is a screenshot of a light-emitting assembly.

Referring to FIGS. 4, 7 and 8, further, a third step 2222 is also provided in the transverse tube 222, the third step 2222 is positioned at one side of the second step 2221 close to the opening of the transverse tube 222. When the connector 32 is inserted into the transverse tube 222, a front end of the connector 32 abuts against the third step 2222, so as to ensure that the DC socket 31 is aligned with the DC plug 23, and thus, the electrical connection may be accurately achieved.

To prevent dust and moisture from entering through a connecting gap between the connector 32 and the transverse tube 222, at least one annular placement groove 321 is formed in an outer peripheral wall of the connector 32. An additional silicone ring 33 is nested in the placement groove 321. The interference fit of the silicone sealing ring achieves the triple effects of sealing, damping and automatic centering. The placement groove 321 on an outer wall of the connector 32 is configured to accurately position and fix the silicone sealing ring. When the user inserts the connector 32 into the transverse tube 222, the silicone ring 33 is compressed due to inherent flexibility, generating a strong radial friction force with an inner wall of the transverse tube 222.

Further, two placement grooves 321 and two silicone rings 33 are provided, which are respectively positioned at the front end and the rear end of the outer wall of the connector 32. The two friction pairs provide greater total friction, and the front and rear pairs work together to correct any possible eccentricity to the maximum extent, ensuring that the connector 32 and the DC socket 31 inside the connector are strictly maintained on the same axis as the DC plug 23 in the transverse tube 222, so that the connector 32 has excellent axial and radial stability without any shaking after insertion, and the operating damping feels heavier.

Further, the light-emitting assembly 3 includes a lamp tube body 34, and a third internal thread 341 is formed inside one end of the lamp tube body 34. Correspondingly, a third external thread 322 matching the third internal thread 341 is processed at an outer side of one end of the connector 32 facing the lamp tube. The third external thread 322 is screwed into the third internal thread 341 of the lamp tube body 34 by rotating the connector 32, so that the two threads can be firmly connected together. The threaded connection mode has a simple structure, reliable connection and a high tensile strength, and is convenient for replacing the lamp tube body 34 with different lengths, styles or light colors in the future, thereby achieving a modular design. The external thread is provided on a portion of the connector 32 extending beyond the transverse tube 222. The lamp tube body 34 is preferably in the shape of an elongated cylinder. In other embodiments, the light-emitting body may also be a bulb structure, and the lamp tube body 34 may also be in a structure of other shapes.

A lamp panel assembly 35 is provided in the lamp tube body 34, the DC socket 31 is connected to the lamp panel assembly 35, and the lamp panel assembly 35 generally includes a long aluminum substrate and a plurality of LED chips welded thereon. To allow light to pass through, a light-transmitting area 4 is provided on a wall surface of the lamp tube body 34, and a light-emitting surface of the lamp panel assembly 35 faces the light-transmitting area 4 when being mounted. The light-transmitting area 4 may be a continuous transparent or frosted window, or may be composed of a plurality of discrete light-transmitting holes. The heat generated by the lamp panel assembly 35 during operation may be transferred to the lamp tube body 34 through the aluminum substrate for dissipation.

In a specific implementation, the lamp tube body 34 is made of metal, and the light-transmitting area 4 is an opening 36 directly processed on the lamp tube body 34. A corresponding opening 36 may be reserved by cutting, stamping or injection molding. At the opening 36, a light-transmitting cover 37 is provided to cover the opening 36, and the light-transmitting cover 37 may be covered and sealed outside the opening 36 by buckling, gluing, or ultrasonic welding. The light-transmitting cover 37 may be made of materials such as polycarbonate (PC), polymethyl methacrylate (PMMA), or glass, and a surface of the light-transmitting cover may be optically treated with frosting, ribs, micro lenses to homogenize light, eliminate glare, and protect the internal LED from physical damage and pollution. This structure has greater design flexibility and better optical effects than a simple transparent tube wall.

A detachable plug 38 is provided at the other end of the lamp tube body 34 far away from the connector 32 for sealing. The plug 38 is preferably fixed to the lamp tube body 34 by a threaded connection. The detachable plug 38 is configured to seal the lamp tube to prevent foreign matter from entering and facilitate factory assembly.

Based on the wall lamp, the present invention also provides an assembly method for the wall lamp. The following detailed description of the preferred embodiment of the method is made in combination with the accompanying drawings. The method includes the assembly of the connection structure 2, the fixation of the connection structure 2, the assembly of the light-emitting assembly 3, and the final assembly. The assembly of the light-emitting assembly 3 and the assembly of the connection structure 2 can be parallel steps.

Specifically, step S1 includes the assembly of the connection structure 2. The upper end of the first member 212 is screwed into the first internal thread 2212 at a bottom of the vertical tube 221, and is tightened until an end surface of the first member abuts against the first step 2211 in the vertical tube 221, so that the first member and the vertical tube are firmly connected. The DC plug 23 is connected to the electric wire 231 from a rear part of the DC plug, and the electric wire 231 passes through the internal channels of the vertical tube, the first member 212 and the second member 213 from the transverse tube 222, and is reserved with a sufficient length. The male connector is then inserted into the opening of the transverse tube 222 until the abutting part of the male connector abuts against the second step 2221 in the transverse tube 222 for securing. This step completes the mechanical assembly and electrical pre-wiring. The sequence of routing the electrical wire 231 and securing of the DC power plug 23 may be adjusted based on practical technical requirements.

Next, step S2 of the fixation of the connection structure 2 is performed. The assembly of the connection structure 2 assembled in the step S1 is taken up, and the lower end of the second member 213 passes through the base 1 and extends into the accommodating cavity 12. The electric wire 231 then passes through the hollow nut and is connected to the corresponding interface on the control assembly. Finally, the hollow nut is tightened in the accommodating cavity 12 so as to closely match the second external thread 2133 of the second member 213 and firmly lock the second member 213 on the base 1. This step mounts the connection structure 2 to the base 1, and completes the final electrical connection.

In parallel or before or after step S1, step S3 of the assembly of the light-emitting assembly 3 is performed. The connector 32 is taken, and the silicone ring 33 is expanded and sleeved into the placement groove 321 on the outer wall of the connector. The DC socket 31 is then fixedly mounted to a mounting position inside the connector 32, and a lead of the DC socket is electrically connected to a lamp tube assembly. The third external thread 322 of the connector 32 is screwed into the third internal thread 341 at one end of the lamp tube body 34 and is tightened and fixed. Finally, the plug 38 is installed on the other end of the lamp tube body 34 to complete the assembly of the lamp tube and form a complete light source module.

Finally, step S4 of the final assembly is performed. The female connector on the connector 32 is aligned with the male connector on the port of the transverse tube 222, and then pushed in steadily and forcefully along the axial direction. In this process, the silicone ring 33 on the outer wall of the connector 32 and the inner wall of the transverse tube 222 generate compression friction, providing a smooth damping feeling, and ensuring that the connector and the transverse tube are automatically centered until the two are inserted in place. Therefore, the mechanical assembly and electrical conduction are completed. In this case, the assembly of the entire wall lamp is completed.

The above mentioned contents are only optional embodiments of the present invention and are not intended to limit the patent scope of the present invention, and under the inventive concept of the present invention, the equivalent structural transformations made by using the contents of the specification and the drawings of the present invention, or direct/indirect applications to other related technical fields, are all included in the patent protection scope of the present invention.

What is claimed is:

1. A lamp, comprising:

a base comprising an accommodating cavity, wherein a control assembly is provided in the accommodating cavity;

a connection structure comprising: a pivot connecting member, a bending component and an axial limiting structure;

wherein the pivot connecting member is provided with a second through hole penetrating therethrough, and one end of the pivot connecting member extends into the accommodating cavity and is fixedly connected to the base;

the bending component comprises a vertical tube and a transverse tube, wherein the transverse tube is provided with a first through hole that connects the vertical tube and the transverse tube, wherein the vertical tube abuts against an upper surface of the base, the pivot connecting member is sleeved in the vertical tube, and the axial limiting structure is configured to limit relative movement of the vertical tube and the pivot connecting member along a vertical direction and allow relative rotational movement of the vertical tube and the pivot connecting member, a male connector is provided at a free end of the transverse tube, and an electric wire sequentially passes through the first through hole and the second through hole and then is electrically connected to the control assembly; and a light-emitting assembly provided with a female connector cooperating with the male connector, wherein the light-emitting assembly is detachably connected to the connection structure through cooperation between the male connector and the female connector, and is thereby electrically connected to the control assembly.

2. The lamp according to claim 1, wherein the pivot connecting member comprises a first member and a second member that are coaxially arranged and rotate relative to each other, a lower end of the second member extends into the accommodating cavity and is fixedly connected to the base, an upper end of the first member is connected to the vertical tube, a lower end of the first member is provided with a first engagement portion, an upper end of the second member is provided with a second engagement portion adapted to the first engagement portion, and the first engagement portion and the second engagement portion are assembled and clamped to form the axial limiting structure.

3. The lamp according to claim 2, wherein the first engagement portion is a hook formed at the lower end of the first member, the second engagement portion is a recessed annular clamping groove formed at the upper end of the second member, and the hook is clamped with the annular clamping groove.

4. The lamp according to claim 3, wherein the first member and the second member have the same outer diameter, an annular groove is provided at a lower part of the first member, the hook is arranged at a lower end of the annular groove, and an annular protrusion matching the annular clamping groove is provided at an upper end of the annular clamping groove.

5. The lamp according to claim 2, wherein a first step is provided inside the vertical tube, a first internal thread is provided on an end surface of the first step, a first external thread matching the first internal thread is provided on the upper end of the first member, the first member is screwed into the vertical tube by cooperation between the first external thread and the first internal thread, and an upper end part of the first member abuts against the end surface of the first step.

6. The lamp according to claim 2, wherein a second external thread is provided at the lower end of the second member, a hollow nut is provided in the accommodating cavity, and the second member is locked and fixed on the base by thread fit between the hollow nut and the second external thread.

7. The lamp according to claim 2, wherein the bending component is T-shaped, two groups of the transverse tubes and two groups of the light-emitting assemblies are provided and symmetrically arranged, and the two groups of transverse tubes are communicated with the vertical tube.

8. The lamp according to claim 7, wherein a second step is provided inside the transverse tube, an abutting part is provided at one end of the male connector facing an interior of the transverse tube, the abutting part is adapted to the second step, and the male connector is inserted from an opening of the transverse tube and secured on the second step.

9. The lamp according to claim 8, wherein the male connector is a DC plug, and the female connector is a DC socket matching the DC plug.

10. The lamp according to claim 9, wherein a connector is provided at one end of the light-emitting assembly, and the DC socket is fixedly mounted on the connector; and when the light-emitting assembly is connected to the connection structure, the connector is at least partially inserted into the opening of the transverse tube, and the DC socket is electrically connected to the DC plug.

11. The lamp according to claim 10, wherein at least one placement groove is provided on an outer wall of the connector, and a silicone ring is provided in the placement groove; and when the connector is inserted into the transverse tube, the silicone ring forms an interference fit with an inner wall of the transverse tube.

12. The lamp according to claim 11, wherein two placement grooves and two silicone rings are provided and positioned at a front end and a rear end of the outer wall of the connector, respectively.

13. The lamp according to claim 10, wherein the light-emitting assembly comprises a lamp tube body, one end of the lamp tube body is provided with a third internal thread, and the connector is threadedly connected to the lamp tube body via a third external thread provided on an outer side of the connector.

14. The lamp according to claim 13, wherein a lamp panel assembly is provided in the lamp tube body, a light-transmitting area is provided on a wall surface of the lamp tube body, and a light-emitting surface of the lamp panel assembly faces the light-transmitting area.

15. The lamp according to claim 14, wherein the light-transmitting area is an opening formed on the lamp tube body, and the light-emitting assembly further comprises a light-transmitting cover covering an exterior of the opening.

16. The lamp according to claim 13, wherein a detachable plug is provided at one end of the lamp tube body that is opposite from the connector.

17. The lamp according to claim 16, wherein the plug is threadedly connected to the lamp tube body.

18. The lamp according to claim 1, wherein the lamp is a wall lamp or a table lamp.

19. An assembly method for the lamp according to claim 16, comprising the following steps:

S1: assembly of the connection structure: screwing and fixing the first member and the vertical tube through threads, inserting the male connector into the transverse tube and fixing the male connector through riveting, and connecting the electric wire to the control assembly after sequentially passing through the male connector, the transverse tube, the first through hole, the first member and a second member, S2: fixation of the connection structure: passing the lower end of the second member through the base and fastening and fixing the lower end of the second member in the accommodating cavity with the hollow nut, thereby completing the assembly and electrical connection between the connection structure and the base;

S3: assembly of the light-emitting assembly: sleeving the silicone ring in the placement groove of the connector, fixing the female connector on the connector, connecting the connector to one end of the lamp tube body, and mounting a plug at the other end of the lamp tube body; and S4: final assembly: aligning and inserting the female connector on the light-emitting assembly to the male connector on the connection structure to complete the assembly of the lamp.

* * * * *